(12) United States Patent
Petrovic

(10) Patent No.: US 7,159,118 B2
(45) Date of Patent: Jan. 2, 2007

(54) METHODS AND APPARATUS FOR EMBEDDING AND RECOVERING WATERMARKING INFORMATION BASED ON HOST-MATCHING CODES

(75) Inventor: Rade Petrovic, San Diego, CA (US)

(73) Assignee: Verance Corporation, San Diego, CA (US)

( * ) Notice: Subject to any disclaimer, the term of this patent is extended or adjusted under 35 U.S.C. 154(b) by 910 days.

(21) Appl. No.: 10/066,039

(22) Filed: Jan. 31, 2002

(65) Prior Publication Data

US 2003/0014634 A1    Jan. 16, 2003

Related U.S. Application Data

(60) Provisional application No. 60/282,241, filed on Apr. 6, 2001.

(51) Int. Cl.
H04L 9/00 (2006.01)
H04N 7/176 (2006.01)

(52) U.S. Cl. .............. 713/176; 380/238; 380/239; 726/32

(58) Field of Classification Search .......... 713/176
See application file for complete search history.

(56) References Cited

U.S. PATENT DOCUMENTS

| | | |
|---|---|---|
| 4,876,617 A | 10/1989 | Best et al. |
| 5,073,925 A | 12/1991 | Nagata et al. |
| 5,113,437 A | 5/1992 | Best et al. |
| 5,319,735 A | 6/1994 | Preuss et al. |
| 5,450,490 A | 9/1995 | Jensen et al. |
| 5,579,124 A | 11/1996 | Aijala et al. |
| 5,581,800 A | 12/1996 | Fardeau et al. |
| 5,613,004 A | 3/1997 | Cooperman et al. |
| 5,687,191 A | 11/1997 | Lee et al. |
| 5,764,763 A | 6/1998 | Jensen et al. |
| 5,822,360 A | 10/1998 | Lee et al. |
| 5,828,325 A | 10/1998 | Wolosewicz et al. |

(Continued)

FOREIGN PATENT DOCUMENTS

WO    WO 9939344 A1 *  8/1999

OTHER PUBLICATIONS

ACM Multimedia 2000 Los Angeles CA USA Copyright ACM 2000, A Robust Blind Watermarking Scheme based on Distributed Source Coding Principles. (by Jim Chou, Sandeep Pradhan and Kannan Ramchandran) Retrieved Date Oct. 1, 2005.*

(Continued)

*Primary Examiner*—Gilberto Barron, Jr.
*Assistant Examiner*—Samson Lemma
(74) *Attorney, Agent, or Firm*—Lipsitz & McAllister, LLC

(57) ABSTRACT

The invention provides apparatus and methods for embedding and recovering watermarking information based on host-matching codes. A code selector provides codes to be embedded in the host signal. The code selector associates distinct input data strings to be embedded into the host signal with distinct code sets. Codes from the associated code sets are selected to represent the input data strings based on an analysis of the host signal (i.e. "host-matching"). The code selector may associate the distinct input data strings with distinct code sets based on a predefined mapping. An embedder embeds the codes into the host signal to provide a watermarked signal. An extractor at a decoder extracts the embedded codes from the watermarked signal. A code interpreter interprets the codes to recover the data represented thereby. The interpreter may perform a many-to-one mapping of an extracted code to the associated data string.

60 Claims, 4 Drawing Sheets

U.S. PATENT DOCUMENTS

| | | | |
|---|---|---|---|
| 5,893,067 A | | 4/1999 | Bender et al. |
| 5,940,135 A | * | 8/1999 | Petrovic et al. ............. 348/473 |
| 6,145,081 A | * | 11/2000 | Winograd et al. ............ 726/33 |
| 6,175,627 B1 | * | 1/2001 | Petrovic et al. ............... 380/42 |
| 6,400,826 B1 | | 6/2002 | Chen et al. |
| 6,424,726 B1 | | 7/2002 | Nakano et al. |
| 6,427,012 B1 | * | 7/2002 | Petrovic .................... 380/238 |
| 6,430,301 B1 | * | 8/2002 | Petrovic .................... 382/100 |
| 6,674,861 B1 | * | 1/2004 | Xu et al. .................... 380/252 |
| 6,683,958 B1 | * | 1/2004 | Petrovic .................... 380/238 |
| 6,737,957 B1 | * | 5/2004 | Petrovic et al. ............ 340/5.86 |
| 6,996,249 B1 | | 2/2006 | Miller et al. |
| 2002/0097873 A1 | * | 7/2002 | Petrovic .................... 380/238 |
| 2003/0063747 A1 | * | 4/2003 | Petrovic .................... 380/238 |
| 2004/0028255 A1 | * | 2/2004 | Miller ....................... 382/100 |
| 2004/0151316 A1 | * | 8/2004 | Petrovic .................... 380/255 |
| 2004/0169581 A1 | * | 9/2004 | Petrovic et al. ............. 340/5.2 |

OTHER PUBLICATIONS

A.V. Kuznetsov, et al., "An Error Correcting Scheme for Defective Memory", IEEE Trans. Inf. Theory, vol. IT-24, No. 6, pp. 712-718 (Nov. 1978) (7 pages).

C. Heegard, et al., "On the Capacity of Computer Memory with Defects", IEEE Trans. Info. Theory, vol. IT-29, No. 5, pp. 731-739 (Sep. 1983) (9 pages).

M. Costa, "Writing on Dirty Paper" IEEE Trans. On Info. Theory, IT-29, No. 3, pp. 439-441 (May 1983) (3 pages).

J. Chou, et al., "A Robust Optimization Solution to the Data Hiding Problem using Distributed Source Coding Principles", Pro. SPIE, vol. 3971, San Jose, CA (Jan. 2000) (10 pages).

* cited by examiner

METHODS AND APPARATUS FOR EMBEDDING AND RECOVERING WATERMARKING INFORMATION BASED ON HOST-MATCHING CODES

This application claims the benefit of U.S. provisional patent application No. 60/282,241 filed on Apr. 6, 2001.

BACKGROUND OF THE INVENTION

The present invention relates generally to watermarking of digital signals, and more particularly to the provision of digital watermarks based on host-matching codes. Such watermarks are used, for example, to hide information in an audio or video signal without degrading the quality of the audio or video output.

Digital watermarks are auxiliary signals embedded into a host signal in such a way that they are substantially imperceptible during standard usage of the host signal, but detectable by specially designed watermark extractors. Typical host signals are audio and video signals, images, faxes, computer files, and the like. A typical objective of watermarking is to provide copy protection for the content contained in the host signal. Other applications of digital watermarks include broadcast monitoring, host-signal integrity verification, entertainment, and the like.

A number of distinct prior art watermarking technologies have been proposed and patented. These technologies achieve different levels of transparency (fidelity, or non-perceptibility), robustness to standard host-signal processing, tamper resistance, implementation cost, throughput (watermark data rate), false positive rate, and layering potential. Typically, it is possible to trade one of the listed properties for another. For example, by changing the amount of inserted signal (a.k.a. watermark strength) it is possible to trade transparency for robustness. Many proposed techniques use error-correction-codes to trade throughput for robustness, which could be traded further for transparency.

It would be advantageous to provide a technique that can be used to trade throughput directly for transparency, and indirectly for robustness. It would be further advantageous to provide such a technique that is more efficient than using error-correction-codes. The methods and apparatus of present invention provides these and other advantages, as more fully described below.

SUMMARY OF THE INVENTION

The present invention relates to methods and apparatus for embedding and recovering watermarking information based on host-matching codes. The proposed technique is related to research that has been done to overcome problems with defective memories. The error-correcting schemes for defective memory are described in, for example, A. V. Kusnetsov et al. "An error correcting scheme for defective memory", IEEE Trans. Info. Theory, vol. IT-24, no 6, pp. 712–718, November 1978 (referred to herein as "Kusnetsov"), and C. Heegard, and A. A. el Gamal, "On the Capacity of Computer Memory with Defects", IEEE Trans. Info. Theory, vol. IT-29, no. 5, pp. 731–739, September 1983 (referred to herein as "Heegard"). These schemes are concerned with improving reliability and yield rate of computer memory containing cells that are stuck at certain state (zero or one), which cannot be changed to match the input signal. The general approach is to assign a set of codes to each message that is to be stored, and to search for the code within the set that matches the pattern of stuck bits. It has been shown that the redundancy needed to mask a number (t) of stuck bits is much smaller than the redundancy needed to correct the same number (t) of random errors. The code sets proposed in Kusnetsov and Heegard have interesting properties, such as maximum Hamming distance within a set, which make them useful for the application disclosed herein.

A paper by M. Costa, "Writing on dirty paper", IEEE Trans. on Info. Theory, IT-29, pp. 439–441, May 1983, proves the theoretical concept that if the channel noise is known to the encoder/transmitter, but not to the decoder/detector, the channel capacity is the same as if both the encoder/transmitter and the decoder/detector know the noise. In a watermarking application, as provided by the present invention, the host signal can be considered as a noise component interfering with the watermark signal transmission. An underlying (albeit imprecise) analogy is that the watermarks should be designed to incorporate features of the host signal in the same way that when writing on dirty paper, the writer should try to incorporate the dirt spots to be part of the writing.

In an exemplary embodiment of the invention, apparatus and methods for embedding watermarking information are provided. A code selector is provided for providing codes to be embedded in a host signal. The code selector associates distinct input data strings to be embedded into the host signal with distinct code sets. Codes from the associated code sets are selected to represent the input data strings based on an analysis of the host signal (i.e. host-matching of the code to the host signal). An embedder is provided for embedding the codes into the host signal to provide a watermarked signal.

The code selector may associate the distinct input data strings with distinct code sets based on a predefined mapping. In such an embodiment, the predefined mapping is known to both the code selector at an encoder and a code interpreter at a decoder (also referred to herein as a "detector").

A transmitter may be provided for transmitting the watermarked signal to a decoder. An extractor at the decoder extracts the embedded codes from the watermarked signal. A code interpreter provides interpreting of the codes to recover the data represented thereby. The interpreting may comprise a many-to-one mapping of an extracted code to the associated data string.

In a further embodiment, a channel encoder for error correction coding of the data may be provided. In addition, a data segmentation device for segmenting the data into the input strings may also be provided.

In an alternate embodiment, a code list generator may be provided for generating, for each input data string, a code set containing the codes. The code set may contain L codes, each of which may be m-bits long. The number of codes L may be less than or equal to $2^{m-n}$, where n is any positive integer and m is greater than n. The codes within the code sets may be selected such that they have a maximum Hamming distance.

In a further embodiment of the invention, a feature extractor may be provided for calculating and extracting relevant features of the host signal. In such an embodiment, a matching device is provided which matches each relevant feature with a code from each code set. The matching device may calculate a cross-correlation factor between the extracted relevant feature and each code from the code set and may compare each cross-correlation factor to determine the code which is a best match for the relevant feature of the host signal. The code may be selected which is a best match for the relevant feature. The selected code is then embedded in the host signal at a location of the relevant feature used in the matching.

Appropriate gains may be assigned to the selected code in order to reduce distortion of the host signal when the selected code is embedded in the host signal. The input strings may be mapped to codes with the objective of minimizing distortion of the host signal. The codes may be symbol-error correcting codes, with each symbol corresponding to one data segment that is mapped to the host matching codes in order to limit error multiplication effects.

In a further embodiment of the invention, apparatus and methods are provided for embedding watermarking information. A first scrambler is provided for scrambling data to be embedded in a host signal with each code from a code set to provide a plurality of scrambled data sequences. A code selector is provided for comparing each scrambled data sequence to the host signal and selecting a scrambled sequence which is a best match to the host signal. An embedder is provided for embedding the best matched scrambled data sequence into the host signal to provide a watermarked signal.

The scrambler may perform an XOR operation between the data and each code of the code set.

A transmitter may be provided for transmitting the watermarked signal to a decoder. An extractor for extracting the embedded scrambled data sequence from the watermarked signal may be provided at the decoder. A second scrambler for generating a plurality of scrambled data sequences is also provided at the decoder. A processor for comparing the extracted scrambled data sequence with the plurality of scrambled data sequences generated at the decoder is provided. The processor determines whether any of the scrambled data sequences generated at the decoder match, within predefined parameters, the extracted data sequence. In this manner, the embedded watermarking data can be recovered or a watermarking signature can be verified.

The second scrambler may generate the plurality of scrambled data sequences at the decoder by scrambling the data with each code from a code set to provide a plurality of scrambled data sequences at the decoder.

A further embodiment of the invention provides additional methods and apparatus for embedding watermarking information. In this embodiment, a channel encoder may be provided for error correction coding of the data to be embedded in a host signal prior to scrambling of the data with each code from a code set to provide a plurality of scrambled data sequences by the scrambler. In this embodiment, the second scrambler at the decoder further scrambles the extracted scrambled data sequence with each code from the code set to provide a plurality of unscrambled data sequences. A channel decoder is provided for error-decoding of each of the unscrambled data sequences and determining which of the error-decoded unscrambled data sequences is a valid watermarking sequence.

The invention also provides for methods and apparatus for recovering embedded watermarking data from a watermarked signal. An extractor is provided for extracting embedded codes from a received watermarked signal. An interpreter is provided for interpreting the extracted codes to recover the watermarking data. Each code represents an input string of the watermarking data, where each code is selected from a code set associated with the input data string based on an analysis of a host signal to be watermarked.

Each code may be associated with the input string based on a predefined mapping known to both a code selector at an encoder and a code interpreter at a decoder. The interpreter may provide a many-to-one mapping of the extracted codes to the data string.

Each code set may contain L codes, each of which is m-bits long. The number of codes L may be less than or equal to $2^{m-n}$, where n is any positive integer and m is greater than n. The codes within the code sets may be selected such that they have a maximum Hamming distance.

The watermarked signal may be generated at an encoder by calculating relevant features of the host signal and extracting the relevant features from the host signal. Matching is performed to match the relevant feature with a code from each code set.

The matching may comprises calculating a cross-correlation factor between the extracted relevant feature and each code from the code set and comparing each cross-correlation factor to determine the code which is a best match for the relevant feature of the host signal.

A code selector at the encoder selects a code from the code set which is a best match for the relevant feature. An embedder at the encoder embeds the selected code in the host signal at a location of the relevant feature used in for the matching.

Appropriate gains may be assigned to the selected code in order to reduce distortion of the host signal when the selected code is embedded in the host signal.

The codes may be symbol-error correcting codes, with each symbol corresponding to one data segment that is mapped to the host matching codes in order to limit error multiplication effects.

In a further embodiment of the invention, an extractor for extracting an embedded scrambled data sequence from a received watermarked signal is provided. A scrambler is provided for generating a plurality of scrambled data sequences at the decoder. A processor for comparing the extracted scrambled data sequence with the plurality of scrambled data sequences generated at the decoder is provided. The processor determines whether any of the scrambled data sequences generated at the decoder match, within predefined parameters, the extracted data sequence. The embedded scrambled data sequence is selected from a plurality of scrambled data sequences generated by scrambling the watermarking data with each code from a code set, based on a comparison with a host signal.

The scrambler may perform an XOR operation between the watermarking data and each code. The scrambler may generate a plurality of scrambled data sequences at the decoder by scrambling the watermarking data with each code from a code set to provide a plurality of scrambled data sequences at the decoder.

A further embodiment of the invention provides additional methods and apparatus for recovering watermarking data from a watermarked signal. An extractor is provided for extracting an embedded scrambled data sequence from a received watermarked signal. A scrambler for further scrambling the extracted scrambled data sequence with codes from a code set to provide a plurality of unscrambled data sequences is provided. A channel decoder is provided for error-decoding each of the unscrambled data sequences and determining which of the error-decoded unscrambled data sequences is a valid watermarking sequence. The embedded scrambled data sequence is selected from a plurality of scrambled data sequences generated by scrambling error-encoded watermarking data with each code from a code set, based on a comparison with a host signal.

DETAILED DESCRIPTION OF THE INVENTION

Figure 1:
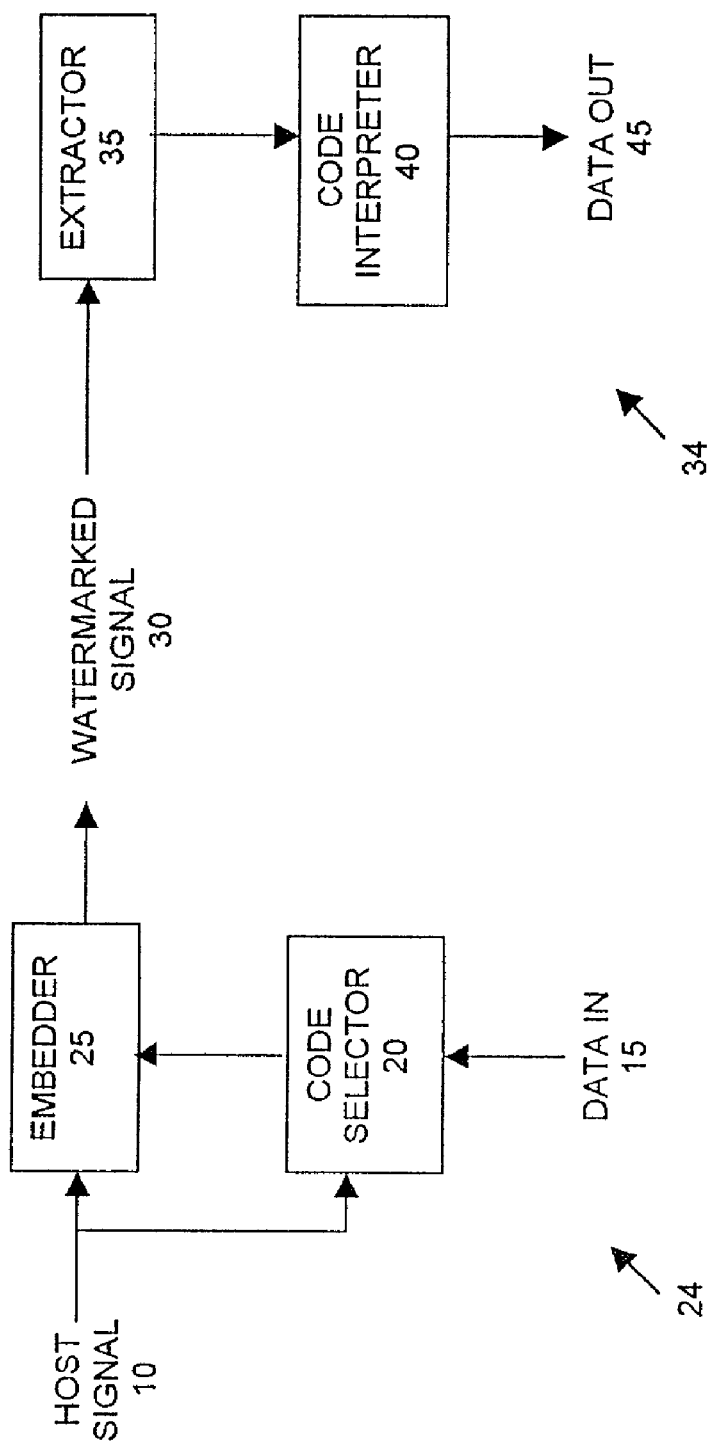
FIG. 1 shows a block diagram of an exemplary embodiment of the invention.

FIG. 1 shows a block diagram of an exemplary embodiment of the invention. Inputs into the system are a host signal 10 and the data 15 that is to be embedded into the host signal 10. The host signal 10 can be audio, video, an image signal, or the like. The "data in" signal 15 can be a signature of the author/owner of the host signal, copy-control status, content ID, and the like. It is assumed that data in signal 15 is a digital message, which can be represented by a binary string. Distinct input data strings are associated with distinct code sets. The input data strings may be associated with distinct code sets based on a predefined mapping, which may be known to both the code selector 20 at the encoder 24 and a code interpreter 40 at the decoder 34. The code selector 20 performs the selection of the code from the associated code set based on an analysis of the host signal 10. The code is embedded into the host signal 10 by embedder 25 to provide a watermarked signal 30. The watermarked signal 30 may be sent from the encoder 24 to a decoder/detector 34 by a transmitter (not shown) in a conventional manner. An extractor 35 at a decoder 34 receives the watermarked signal 30 and extracts the embedded code. The code interpreter 40 interprets the extracted codes to recover the input data 45. The code interpreter 40 may perform a simple many-to-one mapping of the received code to the associated data string.

The embedder 25 in FIG. 1 performs embedding of the selected code into the host signal 10 using known watermarking technology, as taught, e.g., by: commonly owned U.S. Pat. No. 5,940,135 to Petrovic, et al. entitled "Apparatus and Method for Encoding and Decoding Information in Analog Signals"; U.S. Pat. No. 5,450,490 to Jensen, et al. entitled "Apparatus and Method for Including Codes in Audio Signals and Decoding"; U.S. Pat. No. 5,319,735 to Preuss, et al. entitled "Embedded Signalling"; U.S. Pat. No. 5,113,437 to Best, et al. entitled "Signal Identification System"; and U.S. Pat. No. 4,876,617 to Best, et al. entitled "Signal Identification". Any watermarking technology with non-zero correlation between the watermark and the host signal can benefit from the techniques of the present invention.

The embedder 25 output is a watermarked signal, which can be transmitted, stored and/or processed according to the standard usage (e.g., as an audio, video and/or image output) of the host signal 10. At some point, depending on application, the watermarked signal 30 is presented to the extractor 35, which recovers the embedded codes and presents them to the code interpreter 40 in order to recover the original data 45.

Those skilled in the art will appreciate that the apparatus for embedding the watermarking information into the host signal (e.g., embedder 25 and code selector 20 of FIG. 1), may be integrated into an encoder 24 as shown in FIG. 1, or may be implemented as a separate device associated with an encoder. Similarly, the detector apparatus of the present invention (e.g., the extractor 35 and the code interpreter 40 of FIG. 1) may be implemented as part of the decoder 34 or as a separate device associated with the decoder 34.

Figure 2:
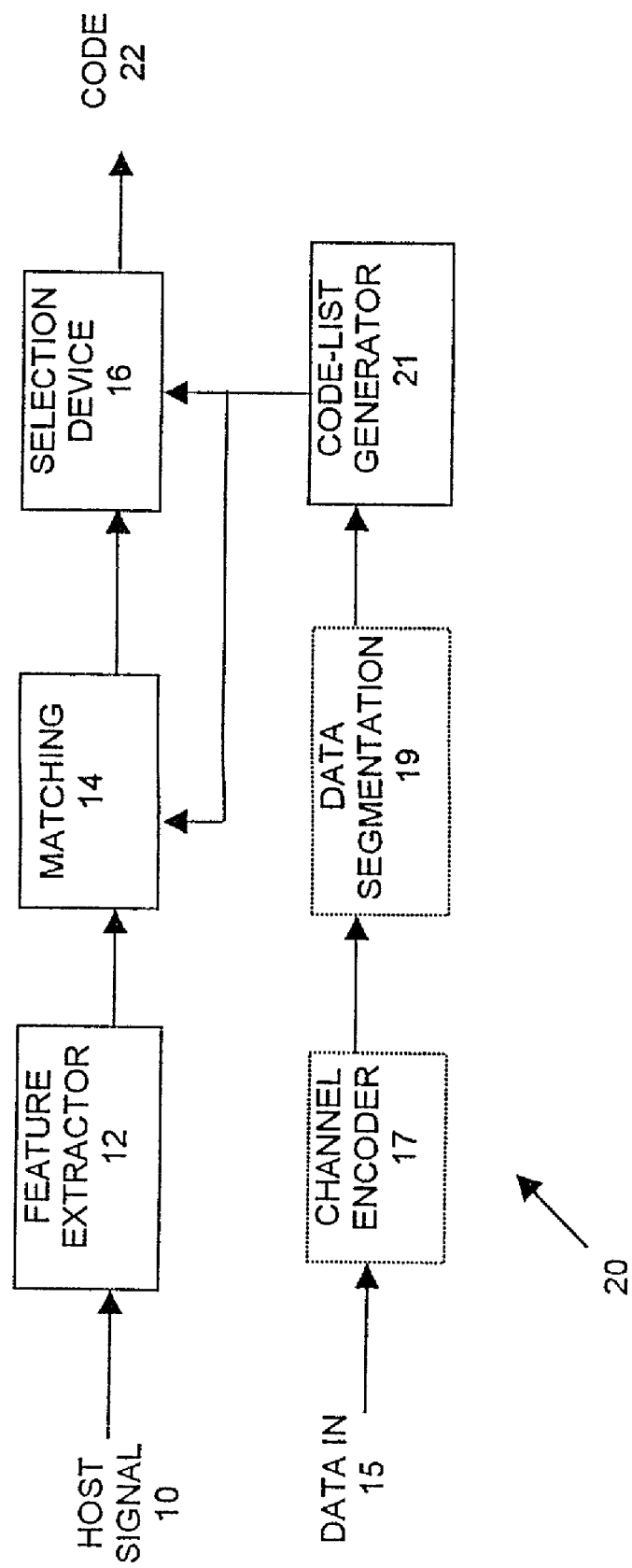
FIG. 2 shows a block diagram of an exemplary embodiment of a code selector of the present invention.

A detailed block diagram of the code selector 20 is shown in FIG. 2. Blocks bounded by dashed lines are optional. The channel encoder 17 typically comprises error-correction coding, which is used when some errors are expected to be introduced into data due to watermarked signal transmission, storage and/or processing. If such errors are unlikely, the channel encoder 17 may be omitted.

Similarly, the data segmentation block 19 would be necessary if the system design calls for breaking the data into n-bit blocks before presenting them to the code-list generator 21. Alternatively, it is possible to design a system where the code-list generator 21 takes the whole message and generates the appropriate code list, and no data segmentation is necessary.

The code-list generator 21 takes in an n-bits long binary message and generates a code set of m-bit long codes, where m is larger than n. The code set contains L codes, where L must be less than or equal to $2^{m-n}$, in order to maintain a distinct list of codes for each input message. The codes in the code set should be different among themselves in as many bits as possible. The generation of code sets with such a property has previously been noted in the context of error-correcting schemes for defective memory. Therefore, the following examples present only a few particularly interesting code-list generators for potential use in watermarking applications. It should be appreciated by those skilled in the art that many other code-list generators can be provided, and the invention is not limited to any particular such generator.

EXAMPLE 1 nB(n+1)B Codes

In this example one bit of redundancy is added to an n-bit input data segment, so that there are two (n+1)-bit codes in the code set for each input n-bit string. These two codes in the set should have opposite content, i.e. if bit zero is in the first position in one code, then the other code should have bit one in the first position, and so on. One way to generate such code sets is to take the input n-bit string and append zero at the end to form the first code in the list. The second code in the list is obtained by inverting the first code (replacing zeros with ones and ones with zeros).

EXAMPLE 2

1B(n+1)B Codes

In this example n-bit redundancy is added to each input bit to form (n+1)-bit codes. When the input is one, the code set should contain all (n+1)-codes with odd parity, while for input zero, the code set should contain all (n+1)-bit codes with even parity, or vice versa. Any code pair in such set is different in at least two bit positions, which is maximum Hamming distance that is possible to guarantee for 1B(n+1)B codes.

EXAMPLE 3

5B8B Codes

In this example, 3-bit redundancy is added to each 5-bit input data segment to generate a set of eight 8-bit codes. In the case where the input 5-bit segment is 00000, the output code set is presented as rows of the matrix C:

$$C = \begin{Vmatrix} 0 & 0 & 0 & 0 & 0 & 0 & 0 & 0 \\ 0 & 0 & 0 & 0 & 1 & 1 & 1 & 1 \\ 0 & 0 & 1 & 1 & 0 & 0 & 1 & 1 \\ 0 & 1 & 0 & 1 & 0 & 1 & 0 & 1 \\ 1 & 1 & 1 & 1 & 1 & 1 & 1 & 1 \\ 1 & 1 & 1 & 1 & 0 & 0 & 0 & 0 \\ 1 & 1 & 0 & 0 & 1 & 1 & 0 & 0 \\ 1 & 0 & 1 & 0 & 1 & 0 & 1 & 0 \end{Vmatrix} \quad (1)$$

In the case where the code-list generator is presented with a 5-bit input in the form $(b_1, b_2, b_3, b_4, b_5)$, where $b_i \in \{0, 1\}$, the code-list generator would generate the first 8-bit code in the form $c_1=(0, b_1, b_2, b_3, b_4, 0, 0, b_5)$. Other codes in the list $c_i$, i=2, 3, . . . , 8, are obtained by performing XOR operation between bits of $c_1$ and bits in rows 2, 3, . . . 8, of matrix C respectively.

The code set obtained in such a way provides a set of unique codes for each input bit string, and the Hamming distance between codes in a list is at least four, which is the best that can be achieved for 5B8B codes.

It should be noted that it is possible to derive acceptable 4B7B, 3B6B, 2B5B, and 1B4B codes by eliminating successively columns 8, 2, 5 and 3 in C and $c_1$. However, a better tradeoff between added redundancy and improved transparency was observed for the proposed 5B8B code.

EXAMPLE 4

124B128B Codes

In this example, a 4-bit redundancy is added to each 124-bit input data segment to generate a set of sixteen 128-bit codes. In the case where the input segment is all zeros, the code set is generated as follows:

| | |
|---|---|
| first code: | 128 zeros, |
| second code: | 64 zeros and 64 ones, |
| third code: | 32 zeros and 32 ones, repeated twice, |
| fourth code: | 16 zeros and 16 ones, repeated four times, |
| fifth code: | 8 zeros and 8 ones, repeated eight times |
| sixth code: | 4 zeros and 4 ones, repeated 16 times |
| seventh code: | 2 zeros and 2 ones, repeated 32 times |
| eight code: | 01 repeated 64 times, |
| 9 to 16 code: | inverted first to eight code. |

For input data segment in the form $(b_1, b_2, \ldots, b_{124})$, the first code is obtained as $(0, b_1, \ldots, b_{14}, 0, b_{15}, \ldots, b_{49}, 0, b_{50}, \ldots, b_{82}, 0, b_{83}, \ldots, b_{124})$. Codes 2 to 16 are obtained by an XOR operation between the first code and codes 2 to 16 of the codes used for all zero input. Again, acceptable code sets can be generated for input codes with less than 124 bits by dropping selected columns in 124B128B code lists.

The feature extractor 12 in FIG. 2 calculates relevant features of the host signal in successive bit intervals. This calculation is dependent on watermarking technology, as described in the following examples.

In the case of short-term autocorrelation modulation technology as disclosed in U.S. Pat. No. 5,940,135 to Petrovic, et al., the relevant feature in the j-th interval, $f_j$, should be calculated according to:

$$f_j = \int_{jT_b}^{(j+1)T_b} s(t)s(t-\tau)dt \quad (2)$$

where $T_b$ is the bit interval, and $\tau$ is the autocorrelation delay, t is the time, and s(t) is the host signal. In other words, feature extractor 12 calculates native short-term autocorrelation in j-th bit interval, before j-th bit of the watermark is inserted.

In the case of a spread-spectrum technology, like that described in commonly owned U.S. Pat. No. 5,822,360 to Lee, et al. entitled "Method and Apparatus for Transporting Auxiliary Data in Audio Signals", the relevant feature in the j-th bit interval, $f_j$, should be calculated according to:

$$f_j = \sum_{k=1}^{K} p_k \int_{jT_b+(k-1)T_c}^{jT_b+kT_c} s(t)dt \quad (3)$$

where $p_k \in \{-1, 1\}$, for k=1, 2, . . . , K, is a pseudo-random chip sequence used during the j-th bit interval, $T_c=T_b/K$ is the chip interval, and the other parameters are defined above.

Generally speaking, the feature extractor 12 should perform the same calculation on the host signal as the extractor 35 does on the watermarked signal, except the last step, where a calculated value is compared to zero in order to detect the bit state. In this way, the native bit state of the host signal 10 is calculated as well as how strongly it is established, before any watermarking takes place. Accordingly, a code can be embedded that would leverage off the existing feature pattern, and minimize required modifications.

The matching device 14 in FIG. 2 matches an extracted relevant feature over the interval selected to embed an m-bit code from all m-bit codes provided by code-list generator 21 in FIG. 2. A selection device 16 selects the code 22 which is a best match for the relevant feature.

In the preferred embodiment, the matching consists of calculating a cross-correlation between the extracted feature and each code from the list:

$$R(f,C)=Cf \quad (4)$$

where C(k, m) represents the matrix of k m-bit long codes, with binary elements $C_{ij} \in \{-1, 1\}$, f is a column vector with elements corresponding to extracted features over m consecutive bit elements, and R is the result of the matching process passed to the selection device 16. The selection process performed by the selection device 16 may consist of finding the element with the highest value in the vector R and selection of the corresponding code from the list.

It should be appreciated that there are other matching algorithms which may have advantages in some applications. For example, for nB(n+1)B codes it is possible to search over vector f and find the bit interval with maximum absolute value. It can be declare that this bit is "stuck" at its native state, and select the code in the list that matches the stuck value at this bit position. Note that for 1B2B codes, both selection algorithms would produce the same result.

Similarly, for 1B(n+1)B, f can be searched to find the minimum absolute value, and find the code in the list that will require embedding in this place only, while all other bits would already have desired bit status. Note that the code lists of 1B(n+1)B codes have a predefined parity, and selection of any bit can adjust the parity to a desired value.

It can be shown that for 5B8B, 124B128B, and their shortened versions, it is possible to select two largest absolute values in the vector f, declare those bits as "stuck" bits, and always find the code in the list C which matches these two stuck bits.

After a code is selected, it is passed to the embedder 25 and embedded in the same host signal portion where the matching is performed (i.e. at a location of the relevant feature in the host signal 10).

In the case of short-term autocorrelation technology as shown in U.S. Pat. No. 5,940,135 to Petrovic, et al., the embedder 25 would typically calculate the native relevant feature again in order to assign appropriate gains to additive signals (i.e. the watermarks). The required processing could be reduced if vector f is exchanged between the feature extractor 12 and the embedder 25. Since the selected code 22 closely matches the native state of the host signal 10, the necessary gains will be lower than gains obtained without the code selection disclosed herein. As a result, the distortion of the original signal 10 will be reduced and transparency of the watermarks improved.

The improvement in transparency depends on watermarking technology at hand, as well as on the amount of redundancy inserted. Generally speaking, those watermarking technologies where the native feature of the host signal 10 has larger variations tend to benefit more from the present invention. Also, the greater amount of redundancy inserted, the larger gains in transparency are possible. In experiments applying the present invention to the watermarking technology disclosed in U.S. Pat. No. 5,940,135 to Petrovic, et al., improvement in host signal to watermark ratio of several decibels was measured for 1B2B codes, without any change in the robustness of the inserted signal. Alternatively, the watermark strength can be increased, and robustness improved, and then the host-matching codes can be introduced in order to compensate transparency losses due to the increased watermark strength.

The host-matching codes disclosed herein are most useful if the watermarking technology is robust against standard processing of the host signal, and no bit errors occur due to host signal transmission, storage and other operations. However, this is usually an unrealistic expectation. Thus, it is still usually necessary to introduce error correction and error detection codes, designed to handle a small number of random errors, as illustrated in FIG. 2 in the channel encoder 17. The problem in this case is that a single bit error in the extractor 12 may generate a code which is interpreted by the code interpreter 40 in such a way that it produces "data out" very much different than "data in." This problem is usually referred to as the "error multiplication problem." Note, however, that this problem is irrelevant for 1B(n+1)B codes, since one output bit at most can be damaged at a time.

One way to alleviate this problem is to use the symbol-error correction codes, with one symbol corresponding to one data segment at the input of the code-list generator. For example, Reed-Solomon (RS) codes with 5-bit symbols may be used and encoded with the 5B8B or 5B6B host-matching codes described above. The benefit of this approach is that with respect to the RS code, it does not matter if one bit or all bits in a symbol are incorrect, and there are no adverse effects of the error multiplication.

Another-approach is to forgo altogether the code interpreter 40 in FIG. 1, and to test detected data for all possible codes in the code list. This implies that the tester is able to distinguish between valid and invalid messages. There are many applications where this approach is possible, some of which are described below as examples.

Figure 3:
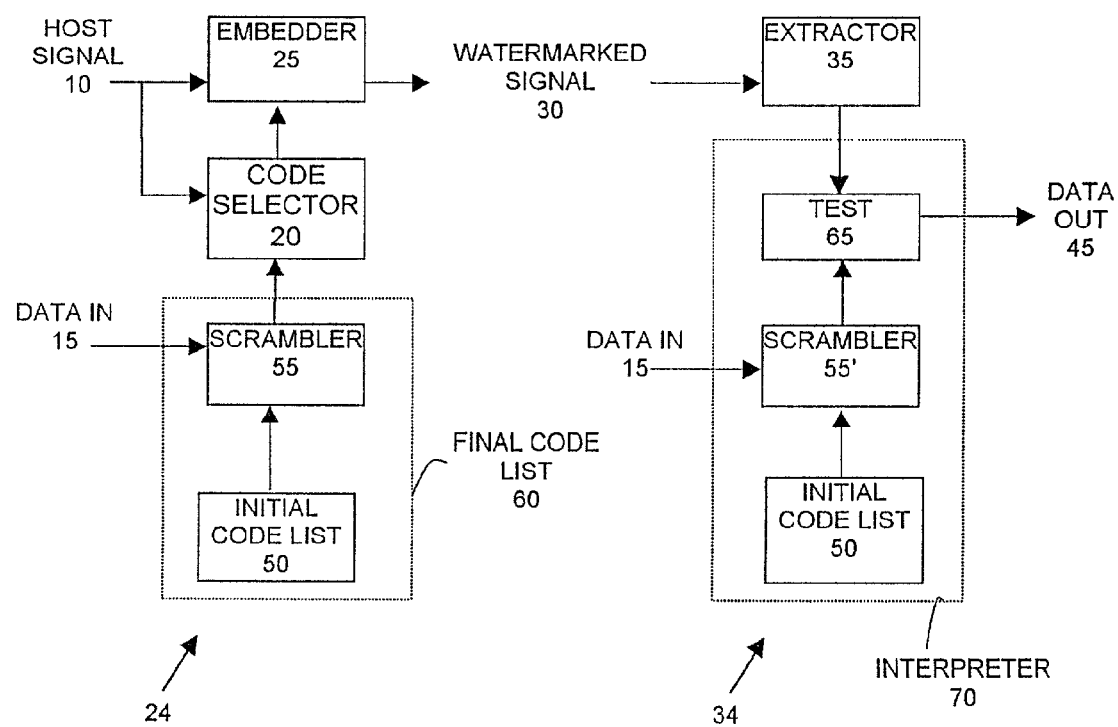
FIG. 3 shows a block diagram of a further embodiment of the invention.

FIG. 3 shows a further embodiment of the invention for embedding watermarking data, such as a "signature" watermark that can be used for proof of ownership, royalty tracking, usage monitoring, and the like. The signature could be, for example, a 128-bit long data string generated in a pseudo-random manner. This signature is presumably unique to the content owner, author, distributor or other interested party. The signature (i.e. data in 15) is scrambled at scrambler 55 with a list of codes from an initial code list 50 to provide a plurality of scrambled data sequences (final code list 60). The codes in the initial code list 50 preferably have a large Hamming distance such as those described in Example 4, above. The scrambling 55 may be performed by an XOR operation between the signature 15 and codes from the list 50. It can be shown that the scrambled sequences have the same Hamming distance properties as the codes in the list.

The code selector 20 in FIG. 3 matches all scrambled sequences to the host signal 10, and selects one with the best match to be embedded. The embedder 25 embeds the selected best-matched scrambled data sequence into the host signal 10.

The watermarked signal 30 is presented to the extractor 35 after transmission, storage and/or other processing, and extracts the embedded data according to the selected watermarking technology. The extracted data are compared (e.g. at test device 65) to all possible scrambled sequences generated in the scrambler 55' from the signature 15 and the code list 50 at interpreter 70. If any of them matches within predefined parameters, e.g., up to 6 bit mismatches, the data out signal 45 indicates that the signature is detected. For example, in the case of a 128-bit long signature sequence, using the code list from example 4 with 16 128-bit codes and with up to a six bit-mismatch tolerance, the probability of false positive is $2.68 \cdot 10^{-28}$. On the other hand, without host-matching codes (i.e. a single 128-bit long signature) and with up to seven bit-mismatch tolerance, the probability of false positive is $2.94 \cdot 10^{-28}$. Note that the host-matching code in example 4 can be used to correct two stuck bits, while a slightly worse probability of false positives is achieved when one extra bit is added to the channel error tolerance of a single signature. This is another illustration of the gains achieved using the host-matching codes of the present invention.

The signature embedding described above is equivalent to selecting a number of signatures instead of a single one, and embedding the best match. Similar approaches can be applied for embedding "do-not-copy" messages, or header bit-patterns that precede data packets. In all these examples, a single pattern is selected for embedding out of a list of possible patterns, while the extractor 35 tests the presence of any of the possible patterns from the list.

Figure 4:
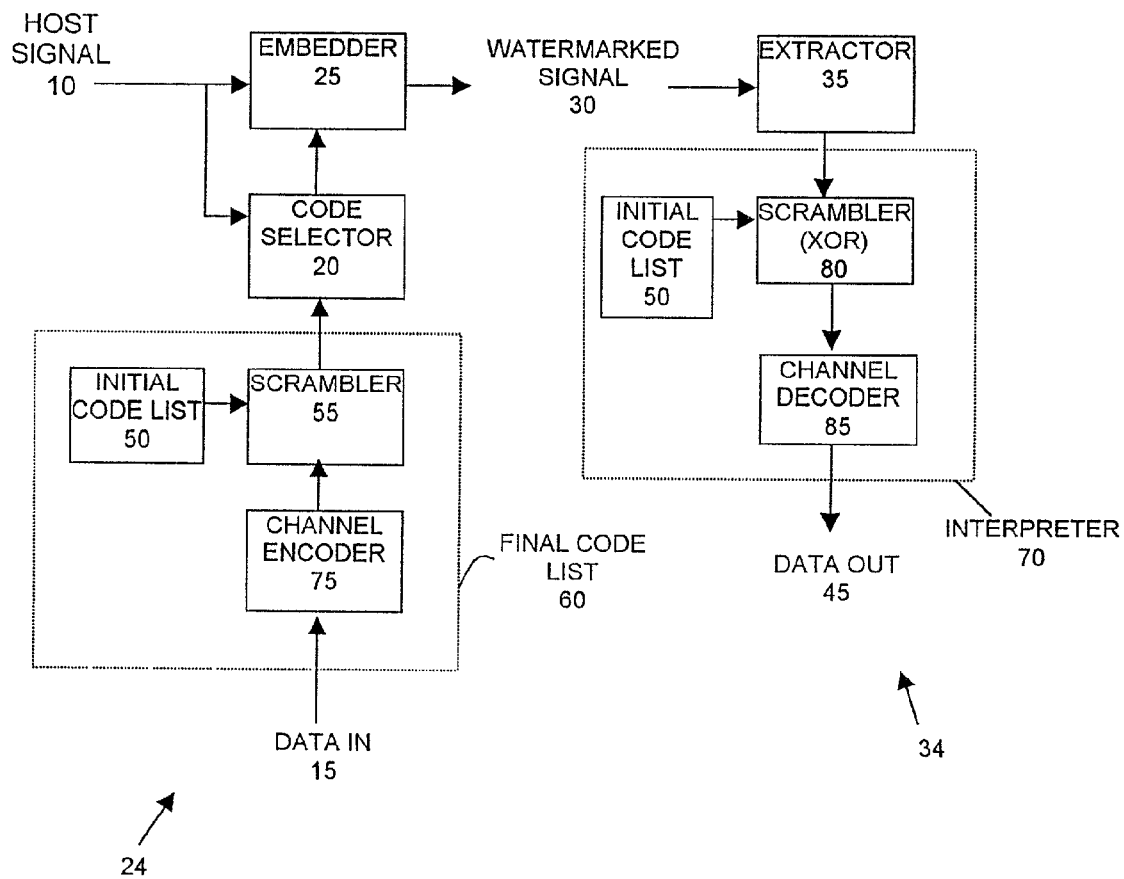
FIG. 4 shows a block diagram of a further embodiment of the invention.

Another example of extraction based on testing for different options is illustrated in FIG. 4. The data in 15 is first encoded using a channel encoder 75, which implies adding redundancy for error correction and/or error detection. Then the message is scrambled at scrambler 55 with a list of codes 50 to provide a plurality of scrambled data sequences (final code list 60) at the encoder 24. The code selector 20 selects a sequence based on matching of all the sequences to the host signal. The best-matched sequence is embedded into the host signal at embedder 25 to produce a watermarked signal 30.

In the extractor 35, a bit stream is recovered according to the selected watermarking technology. Then the bit stream is scrambled at scrambler 80 again with the list of codes 50 too provide a plurality of unscrambled data sequences at the decoder 34. Those skilled in the art know that scrambling a bit stream twice with the same scrambling sequence leaves the original unchanged. Therefore, at the output of the scrambler 80 in the decoder 34, one of the unscrambled sequences should correspond to the selected sequence at the embedder 25. However, since the decoder 34 does not know which code is used for scrambling, it sends all outputs to the channel decoder 85. The channel decoder 85 will detect errors in all invalid sequences and reject them, while recognizing only one as a valid sequence and accept it (e.g., for output 45).

For example consider a 78 bit long message encoded by Bose-Chaundhuri-Hocquenghem (BCH) error-correcting codes to add 49 redundant bits for total of 127 bits. Such code is known to be able to correct up to seven random errors. However, this code is also able to detect errors even in its full error-correction setting (7-bit correction). It can be shown that in this case only about one in 10,000 random sequences would be wrongly corrected and accepted.

Thus, a message encoded by the described BCH(127,78,7) code can be scrambled by codes from the code list described in Example 4 above (the 128-th bit in the code list could be left unused, or the BCH sequence could be appended by a parity bit). Then, the best matching scrambled sequence is found and embedded in the host signal 10. At the detector side (e.g., decoder 34 ), the output of extractor 25 is scrambled again at scrambler 80 with the same code list 50, and all resulting sequences are passed to the channel decoder 85, which will reject all invalid sequences with very high probability, even at no extra redundancy added for this purpose. However, to further increase the probability of rejecting invalid sequences, the error correction capability of the code can be reduced from 7 to 6 or even lower. Alternatively, error-detection codes may be introduced into 78-bit payload, for example using well-known Cyclic Redundancy Check (CRC) codes.

It should be noted that the BCH(127,78,7) code introduces a redundancy of 49 bits in order to allow error correction of 7 random errors, or 7-bit redundancy per one-bit error correction in the case of 127-bit long messages. On the other hand, the codes for "masking" the bit errors in the case of 128-bit messages, described in Example 4 above, need only four bits of redundancy to mask two error bits, i.e. two-bit redundancy per one-bit error. This illustrates the claim of Kusnetsov and Heegard that if the error-pattern is known at the encoder/transmitter, it is possible to design codes that use redundancy much more efficiently than the general-purpose error-correction codes. Thus, since advanced knowledge is available about the host signal and its contribution to noise in the watermarking channel, it is better to use this information in the code selection process, rather than to dedicate additional redundancy to error-correction codes.

It should now be appreciated that the present invention provides advantageous methods and apparatus for embedding and recovering watermarking data based on host-matching codes.

Although the invention has been described in connection with various illustrated embodiments, numerous modifications and adaptations may be made thereto without departing from the spirit and scope of the invention as set forth in the claims.

What is claimed is:

1. A method for embedding watermarking information, comprising:

providing a host signal;
calculating at least one feature of said host signal;
extracting said at least one feature from said host signal;
providing data to be embedded in the host signal;
associating distinct input data strings of said data with distinct code sets;
matching each of said at least one feature with a code from each code set;
selecting codes from the associated code sets to represent said input data strings based on said matching; and
embedding said selected codes into the host signal to provide a watermarked signal.

2. A method in accordance with claim 1, wherein said associating step is based on a predefined mapping.

3. A method in accordance with claim 2, wherein the predefined mapping is known to both a code selector at an encoder and a code interpreter at a decoder.

4. A method in accordance with claim 1, further comprising:

transmitting said watermarked signal to a decoder;
extracting said embedded codes from said watermarked signal; and
interpreting said codes to recover said data.

5. A method in accordance with claim 4, wherein said interpreting step comprises a many-to-one mapping of an extracted code to the associated data string.

6. A method in accordance with claim 1, further comprising:

error correction coding of said data.

7. A method in accordance with claim 1, further comprising:

segmenting the data into said input strings.

8. A method in accordance with claim 1, further comprising:

generating for each input data string a code set containing said codes.

9. A method in accordance with claim 8, wherein:

said code set contains L codes;
each code is m-bits long;
L is less than or equal to $2^{m-n}$;
n is any positive integer; and
m is greater than n.

10. A method for embedding watermarking information, comprising:

providing a host signal;
providing data to be embedded in the host signal;
associating distinct input data strings of said data with distinct code sets;
selecting codes from the associated code sets to represent said input data strings based on an analysis of the host signal; and
embedding said codes into the host signal to provide a watermarked signal
wherein the codes within the code sets are selected such that they have a maximum Hamming distance.

11. A method in accordance with claim 1, wherein said matching comprises:

calculating a cross-correlation factor between the extracted feature and each code from said code set; and
comparing each cross-correlation factor to determine the code which is a best match for said feature of said host signal.

12. A method in accordance with claim 11, wherein:

said selecting step comprises selecting said code which is a best match for said feature; and said embedding step comprises embedding said selected code in the host signal at a location of the feature used in said matching step.

13. A method in accordance with claim 12, further comprising:
assigning appropriate gains to said selected code in order to reduce distortion of the host signal when said selected code is embedded in said host signal.

14. A method in accordance with claim 1, wherein said input strings are mapped to codes with the objective of minimizing distortion of the host signal.

15. A method in accordance with claim 1, wherein said codes are symbol-error correcting codes, with each symbol corresponding to one data segment that is mapped to the host matching codes in order to limit error multiplication effects.

16. A method for embedding watermarking information, comprising:
providing a host signal;
providing data to be embedded in the host signal;
error correction coding of said data;
scrambling said data with each code from a code set to provide a plurality of scrambled data sequences;
comparing each scrambled data sequence to said host signal;
selecting a scrambled sequence which is a best match to said host signal;
embedding said best matched scrambled data sequence into the host signal to provide a watermarked signal;
transmitting said watermarked signal to a decoder;
extracting said embedded scrambled data sequence from said watermarked signal;
further scrambling said extracted scrambled data sequence with each code from said code set to provide a plurality of unscrambled data sequences;
error-decoding of each of said unscrambled data sequences; and
determining which of said error-decoded unscrambled data sequences is a valid watermarking sequence.

17. A method in accordance with claim 16, wherein said scrambling step comprises an XOR operation between the data and each code of the code set.

18. A method for recovering embedded watermarking data from a watermarked signal, comprising the steps of:
receiving said watermarked signal;
extracting embedded codes from said watermarked signal; and
interpreting said extracted codes to recover said watermarking data;
wherein:
each code represents an input string of said watermarking data, each code being selected from a code set associated with said in put data string; and
said watermarked signal is generated by:
calculating at least one feature of said host signal;
extracting said at least one feature from said host signal; and
matching each of said at least one feature with a code from each code set.

19. A method in accordance with claim 18, wherein each code is associated with said input string based on a predefined mapping known to both a code selector at an encoder and a code interpreter at a decoder.

20. A method in accordance with claim 18, wherein said interpreting step comprises a many-to-one mapping of the extracted codes to said data string.

21. A method in accordance with claim 18, wherein:
said code set contains L codes;
each code is m-bits long;
L is less than or equal to $2^{m-n}$;
n is any positive integer; and
m is greater than n.

22. A method in accordance with claim 18, wherein the codes within the code sets are selected such that they have a maximum Hamming distance.

23. A method in accordance with claim 18, wherein said matching comprises:
calculating a cross-correlation factor between the extracted feature and each code from said code set; and
comparing each cross-correlation factor to determine the code which is a best match for said feature of said host signal.

24. A method in accordance with claim 23, wherein:
a code which is a best match for said feature is selected from the code set; and
said selected code is embedded in the host signal at a location of the feature used in said matching step.

25. A method for recovering embedded watermarking data from a watermarked signal, comprising the steps of:
receiving said watermarked signal;
extracting embedded codes from said watermarked signal;
interpreting said extracted codes to recover said watermarking data;
wherein each code represents an input string of said watermarking data, each code being selected from a code set associated with said input data string based on an analysis of a host signal to be watermarked; and
assigning appropriate gains to said selected code in order to reduce distortion of the host signal when said selected code is embedded in said host signal.

26. A method in accordance with claim 18, wherein said codes are symbol-error correcting codes, with each symbol corresponding to one data segment that is mapped to the host matching codes in order to limit error multiplication effects.

27. A method for recovering watermarking data from a watermarked signal, comprising the steps of:
receiving said watermarked signal at a decoder;
extracting an embedded scrambled data sequence from said watermarked signal;
generating a plurality of scrambled data sequences at said decoder;
comparing said extracted scrambled data sequence with said plurality of scrambled data sequences generated at said decoder; and
determining whether any of said scrambled data sequences generated at said decoder match, within predefined parameters, said extracted data sequence;
wherein said embedded scrambled data sequence is selected from a plurality of scrambled data sequences generated by scrambling said watermarking data with each code from a code set, based on a comparison with a host signal.

28. A method in accordance with claim 27, wherein said scrambling of said watermarking data with said codes comprises an XOR operation between the watermarking data and each code.

29. A method in accordance with claim 27, wherein said generating of a plurality of scrambled data sequences at the decoder comprises scrambling said watermarking data with each code from a code set to provide a plurality of scrambled data sequences at said decoder.

30. A method for recovery of watermarking information from a watermarked signal, comprising the steps of:
receiving said watermarked signal;

extracting an embedded scrambled data sequence from said watermarked signal;
further scrambling said extracted scrambled data sequence with codes from a code set to provide a plurality of unscrambled data sequences;
error-decoding each of said unscrambled data sequences; and
determining which of said error-decoded unscrambled data sequences is a valid watermarking sequence;
wherein said embedded scrambled data sequence is selected from a plurality of scrambled data sequences generated by scrambling error-encoded watermarking data with each code from a code set, based on a comparison with a host signal.

31. Apparatus for embedding watermarking information, comprising:
a feature extractor for calculating and extracting at least one feature of said host signal;
a code selector for associating distinct code sets with distinct input data strings to be embedded in a host signal;
a matching device for matching each of said at least one feature with a code from each of said code sets;
said code selector selecting codes from the associated code sets to represent said input data strings based on said matching; and
an embedder for embedding said selected codes into the host signal to provide a watermarked signal.

32. Apparatus in accordance with claim 31, wherein said code selector associates said distinct input data strings with distinct code sets based on a predefined mapping.

33. Apparatus in accordance with claim 32, wherein the predefined mapping is known to both the code selector at an encoder and a code interpreter at a decoder.

34. Apparatus in accordance with claim 31, further comprising:
a transmitter for transmitting said watermarked signal to a decoder;
an extractor for extracting said embedded codes from said watermarked signal; and
a code interpreter for interpreting said codes to recover data represented thereby.

35. Apparatus in accordance with claim 34, wherein said interpreting comprises a many-to-one mapping of an extracted code to the associated data string.

36. Apparatus in accordance with claim 31, further comprising:
a channel encoder for error correction coding of said data.

37. Apparatus in accordance with claim 31, further comprising:
a data segmentation device for segmenting the data into said input strings.

38. Apparatus in accordance with claim 31, further comprising:
a code list generator for generating for each input data string a code set containing said codes.

39. Apparatus in accordance with claim 38, wherein:
said code set contains L codes;
each code is m-bits long;
L is less than or equal to $2^{m-n}$;
n is any positive integer; and
m is greater than n.

40. Apparatus for embedding watermarking information, comprising:
a code selector for providing codes to be embedded in a host signal; and
an embedder for embedding said codes into the host signal to provide a watermarked signal;
wherein:
said code selector;
associates distinct input data strings to be embedded into said host signal with distinct code sets; and
selects codes from the associated code sets to represent said input data strings based on an analysis of the host signal; and
the codes within the code sets are selected such that they have a maximum Hamming distance.

41. Apparatus in accordance with claim 31, wherein:
said matching device calculates a cross-correlation factor between the extracted feature and each code from said code set and compares each cross-correlation factor to determine the code which is a best match for said feature of said host signal.

42. Apparatus in accordance with claim 41, wherein:
said code is selected which is a best match for said feature; and
said selected code is embedded in the host signal at a location of the feature used in said matching.

43. Apparatus in accordance with claim 42, wherein:
appropriate gains are assigned to said selected code in order to reduce distortion of the host signal when said selected code is embedded in said host signal.

44. Apparatus in accordance with claim 31, wherein said input strings are mapped to codes with the objective of minimizing distortion of the host signal.

45. Apparatus in accordance with claim 31, wherein said codes are symbol-error correcting codes, with each symbol corresponding to one data segment that is mapped to the host matching codes in order to limit error multiplication effects.

46. Apparatus for embedding watermarking information, comprising:
a channel encoder for error correction coding of data to be embedded in a host signal;
a first scrambler for scrambling said data with each code from a code set to provide a plurality of scrambled data sequences;
a code selector for comparing each scrambled data sequence to said host signal and selecting a scrambled sequence which is a best match to said host signal;
an embedder for embedding said best matched scrambled data sequence into the host signal to provide a watermarked signal;
a transmitter for transmitting said watermarked signal to a decoder;
an extractor for extracting said embedded scrambled data sequence from said watermarked signal;
a second scrambler for further scrambling said extracted scrambled data sequence with each code from said code set to provide a plurality of unscrambled data sequences; and
a channel decoder for error-decoding of each of said unscrambled data sequences and determining which of said error-decoded unscrambled data sequences is a valid watermarking sequence.

47. Apparatus in accordance with claim 46, wherein said scrambler performs an XOR operation between the data and each code of the code set.

48. Apparatus for recovering embedded watermarking data from a watermarked signal, comprising:
an extractor for extracting embedded codes from a received watermarked signal; and
an interpreter for interpreting said extracted codes to recover said watermarking data;

wherein:
each code represents an input string of said watermarking data, each code being selected from a code set associated with said input data string; and
said watermarked signal is generated at an encoder by:
calculating at least one feature of said host signal;
extracting said at least one feature from said host signal; and
matching each of said at least one feature with a code from each code set.

49. Apparatus in accordance with claim 48, wherein each code is associated with said input string based on a predefined mapping known to both a code selector at an encoder and a code interpreter at a decoder.

50. Apparatus in accordance with claim 48, wherein said interpreter provides a many-to-one mapping of the extracted codes to said data string.

51. Apparatus in accordance with claim 48, wherein:
said code set contains L codes;
each code is m-bits long;
L is less than or equal to $2^{m-n}$;
n is any positive integer; and
m is greater than n.

52. Apparatus in accordance with claim 48, wherein the codes within the code sets are selected such that they have a maximum Hamming distance.

53. Apparatus in accordance with claim 48 wherein said matching comprises:
calculating a cross-correlation factor between the extracted feature and each code from said code set; and
comparing each cross-correlation factor to determine the code which is a best match for said feature of said host signal.

54. Apparatus in accordance with claim 53, wherein:
a code selector at said encoder selects a code from the code set which is a best match for said feature; and
an embedder at said encoder embeds said selected code in the host signal at a location of the feature used in said matching step.

55. Apparatus for recovering embedded watermarking data from a watermarked signal, comprising:
an extractor for extracting embedded codes from a received watermarked signal; and
an interpreter for interpreting said extracted codes to recover said watermarking data;
wherein each code represents an input string of said watermarking data, each code being selected from a code set associated with said input data string based on an analysis of a host signal to be watermarked;
wherein appropriate gains are assigned to said selected code in order to reduce distortion of the host signal when said selected code is embedded in said host signal.

56. Apparatus in accordance with claim 48, wherein said codes are symbol-error correcting codes, with each symbol corresponding to one data segment that is mapped to the host matching codes in order to limit error multiplication effects.

57. Apparatus for recovering watermarking data from a watermarked signal, comprising:
an extractor for extracting an embedded scrambled data sequence from a received watermarked signal;
a scrambler for generating a plurality of scrambled data sequences; and
a processor for comparing said extracted scrambled data sequence with said plurality of scrambled data sequences generated at said decoder, said processor determining whether any of said scrambled data sequences generated at said decoder match, within predefined parameters, said extracted data sequence;
wherein said embedded scrambled data sequence is selected from a plurality of scrambled data sequences generated by scrambling said watermarking data with each code from a code set, based on a comparison with a host signal.

58. Apparatus in accordance with claim 57, wherein said scrambler performs an XOR operation between the watermarking data and each code.

59. Apparatus in accordance with claim 57, wherein said scrambler generates a plurality of scrambled data sequences at the decoder by scrambling said watermarking data with each code from a code set to provide a plurality of scrambled data sequences at said decoder.

60. Apparatus for recovery of watermarking information from a watermarked signal, comprising:
an extractor for extracting an embedded scrambled data sequence from a received watermarked signal;
a scrambler for further scrambling said extracted scrambled data sequence with codes from a code set to provide a plurality of unscrambled data sequences; and
a channel decoder for error-decoding each of said unscrambled data sequences and determining which of said error-decoded unscrambled data sequences is a valid watermarking sequence;
wherein said embedded scrambled data sequence is selected from a plurality of scrambled data sequences generated by scrambling error-encoded watermarking data with each code from a code set, based on a comparison with a host signal.

* * * * *